(12) United States Patent
Katsura et al.

(10) Patent No.: US 10,618,388 B1
(45) Date of Patent: Apr. 14, 2020

(54) SUNROOF HIGH SPEED CATCH DEVICE

(71) Applicant: AISIN TECHNICAL CENTER OF AMERICA, INC., Northville, MI (US)

(72) Inventors: Shintaro Katsura, Novi, MI (US); Michael Mixon, Brighton, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 16/157,823

(22) Filed: Oct. 11, 2018

(51) Int. Cl.
*B60J 7/043* (2006.01)
*B60J 7/057* (2006.01)
*B60J 7/05* (2006.01)

(52) U.S. Cl.
CPC ............ *B60J 7/043* (2013.01); *B60J 7/05* (2013.01); *B60J 7/057* (2013.01)

(58) Field of Classification Search
CPC ..... B60J 7/043; B60J 7/05; B60J 7/057; B60J 7/0573
USPC ................. 296/216.02–216.05, 223, 224
See application file for complete search history.

(56) References Cited

U.S. PATENT DOCUMENTS

| | | | |
|---|---|---|---|
| 4,403,805 A | 9/1983 | Strem, Jr. et al. |
| 5,718,472 A | 2/1998 | Otake et al. |
| 6,290,289 B1 | 9/2001 | Ohtsu et al. |
| 7,125,070 B2 | 10/2006 | Sawada et al. |
| 8,857,903 B2 | 10/2014 | Nellen et al. |
| 8,876,201 B2 | 11/2014 | Katsura |
| 9,290,085 B2 | 3/2016 | Sawada et al. |
| 2012/0112498 A1 | 5/2012 | Kikuchi et al. |

FOREIGN PATENT DOCUMENTS

CN          206623663 U        11/2017
JP          2017-128150 A       7/2017

*Primary Examiner* — Dennis H Pedder
(74) *Attorney, Agent, or Firm* — Oblon, McClelland, Maier & Neustadt, L.L.P.

(57) ABSTRACT

The present disclosure relates to a sunroof apparatus of an automotive vehicle. Specifically, the present disclosure describes a constraining portion of a guiding drive shoe and a constrained portion of a drive link to maintain a drive link angle during high-speed operation of the sunroof apparatus. Moreover, the present disclosure describes a guiding portion of a rear drive shoe and a guided portion of a bracket to guide a glass panel of the sunroof apparatus into a fully-closed position during high-speed operation.

20 Claims, 16 Drawing Sheets

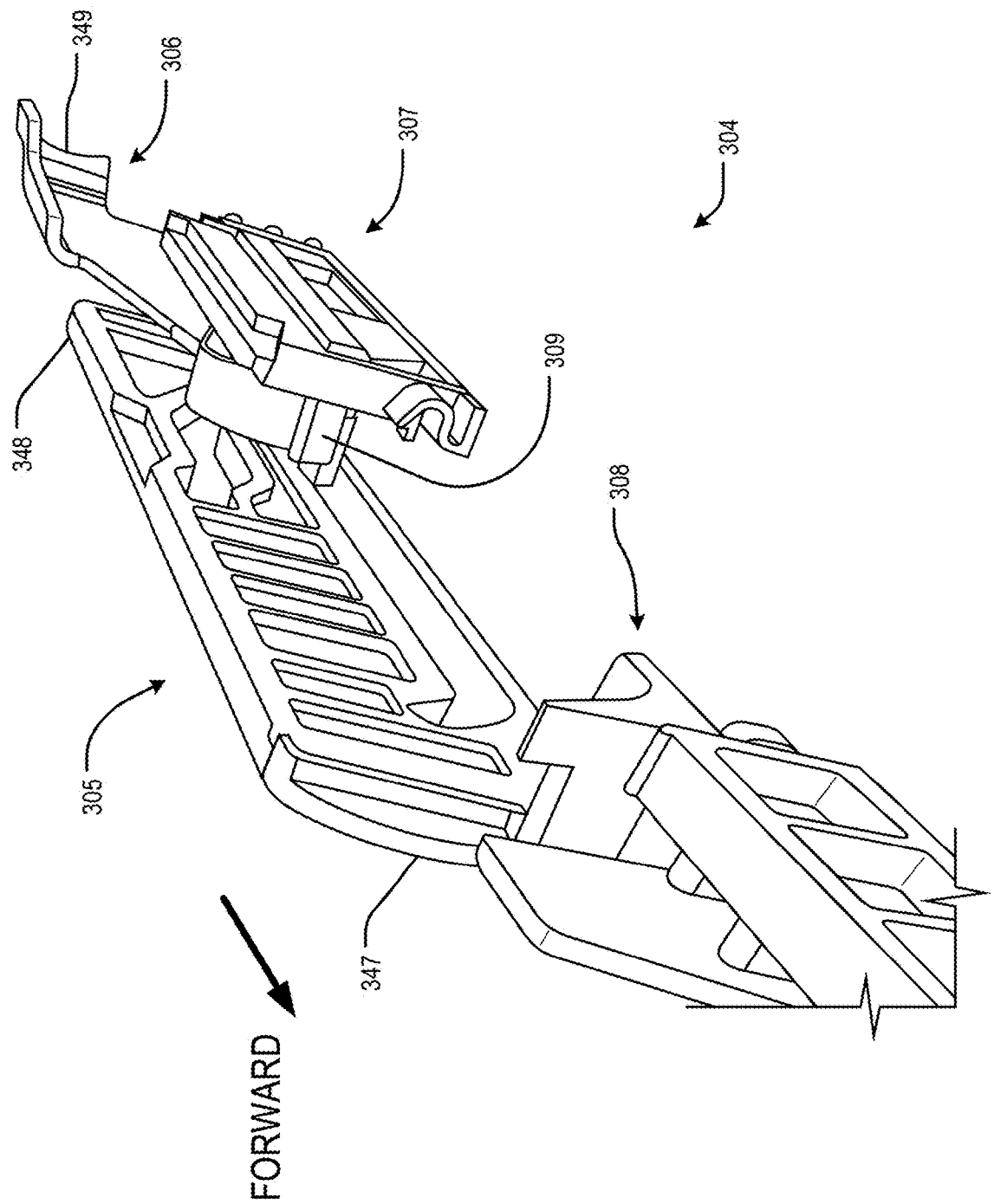

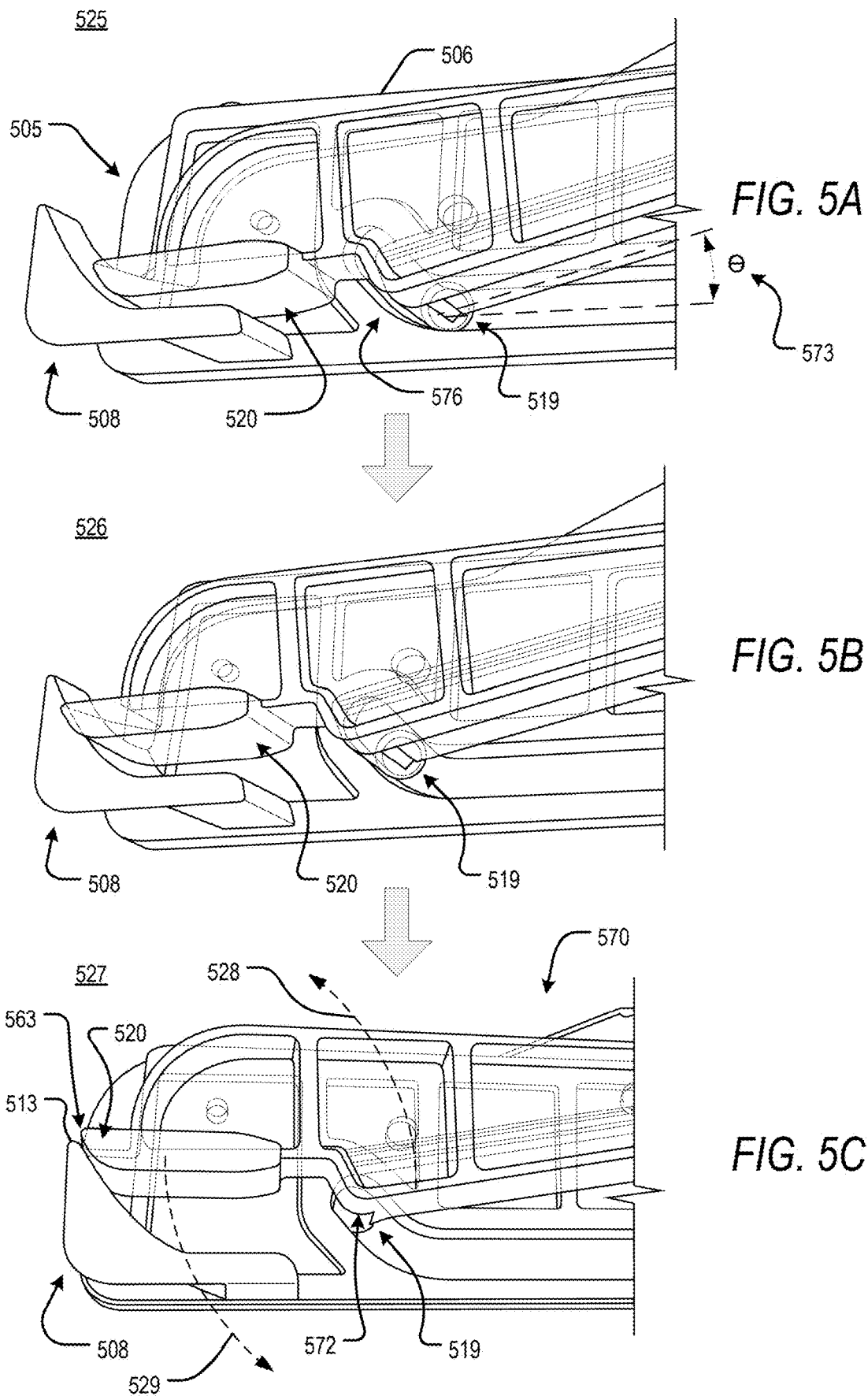

SUNROOF HIGH SPEED CATCH DEVICE

BACKGROUND

Field of the Disclosure

The present disclosure relates to a sunroof apparatus of an automotive vehicle.

Description of the Related Art

Automotive slide roof systems, often called sunroof apparatuses, are installed in many modern vehicles. Such a sunroof apparatus is often capable of both tilting up a glass panel and sliding it in the fore-and-aft directions to provide two modes of opening a part of a fixed roof of the vehicle. Increasingly, this concept has been expanded to panoramic sunroofs that offer all vehicle passengers freedom of view.

In accomplishing a sunroof apparatus, and especially during high-speed operation when forces generated by passing air are applied to the components of the sunroof apparatus, it is vital that components be supported during opening and closing. Specifically, a tilt angle during opening and a resting position during closing of the glass component of the sunroof apparatus need be sufficiently supported for efficient operation.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a rear drive shoe assembly for a sunroof apparatus of an automotive vehicle, comprising a rear bracket, at an aft end of a bracket, including a guided portion, and a rear drive shoe including a guiding portion to guide the guided portion of the rear bracket and a rear bracket slot, the rear bracket slot receiving the guided portion of the rear bracket, wherein the bracket holds a glass panel of the sunroof apparatus and is operably-coupled to a drive link, the drive link including one or more pins projecting from a surface of the drive link, wherein one of the one or more pins projecting from the surface of the drive link is slidably-coupled to a guiding drive shoe as a rotation center, and wherein the rear drive shoe is coupled to a motor, the motor translating the rear drive shoe in a forward direction.

According to an embodiment, the present disclosure is further related to a method of a sunroof apparatus, comprising receiving, via processing circuitry, a user command indicating a closing operation of the sunroof apparatus, and translating, via the processing circuitry, a rear drive shoe including a guiding portion, the guiding portion guiding a guided portion of a rear bracket at an aft end of a bracket holding a glass panel of the sunroof apparatus, wherein the bracket is operably-coupled to a drive link including one or more pins projecting from a surface, one of the one or more pins projecting from the surface of the drive link being slidably-coupled to a guiding drive shoe, wherein the one of the one or more pins projecting from the surface of the drive link is slidably-coupled to the guiding drive shoe and is a rotation center, wherein the rear drive shoe is coupled to a motor, the motor translating the rear drive shoe in a forward direction, and wherein, during forward translation, the guided portion of the rear bracket enters a rear bracket slot within the rear drive shoe.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is an illustration of a guiding drive shoe assembly of a sunroof apparatus, according to an exemplary embodiment of the present disclosure;

FIG. 5A is a schematic of a first position of a front end of a drive link of a guiding drive shoe assembly of a sunroof apparatus, according to an exemplary embodiment of the present disclosure;

FIG. 5B is a schematic of a second position of a front end of a drive link of a guiding drive shoe assembly of a sunroof apparatus, according to an exemplary embodiment of the present disclosure;

FIG. 5C is a schematic of a third position of a front end of a drive link of a guiding drive shoe assembly of a sunroof apparatus, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1A:
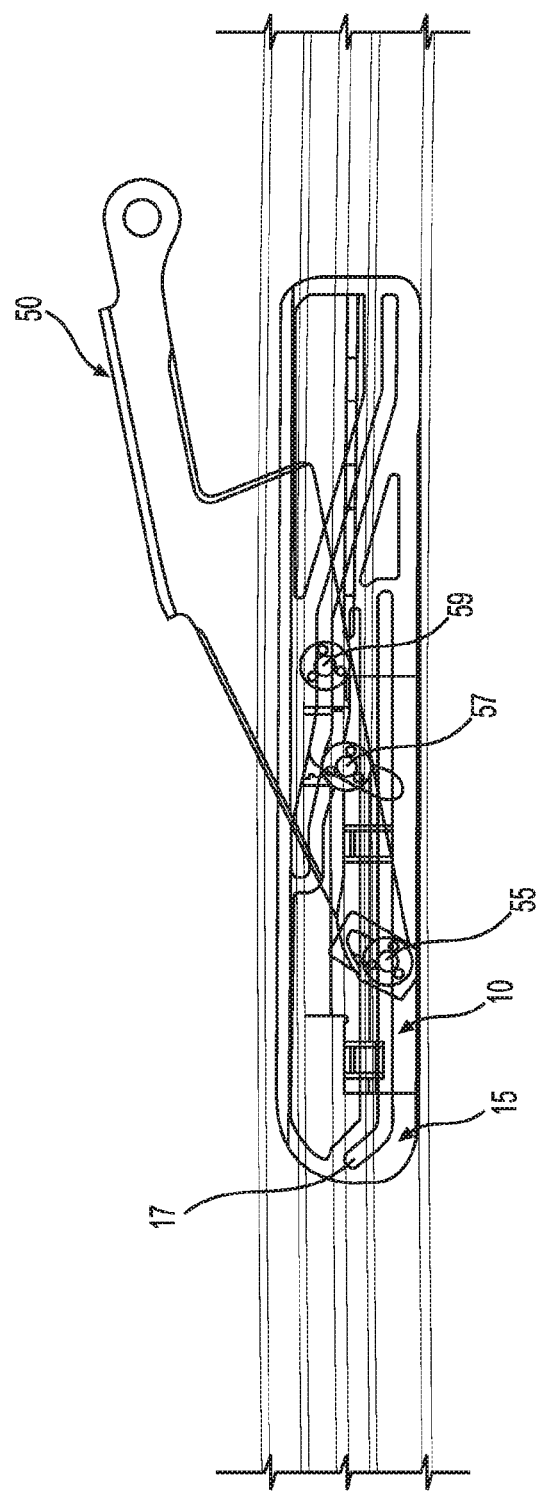
FIG. 1A is an illustration of a component of a sliding apparatus of a sunroof apparatus.
Figure 1B:
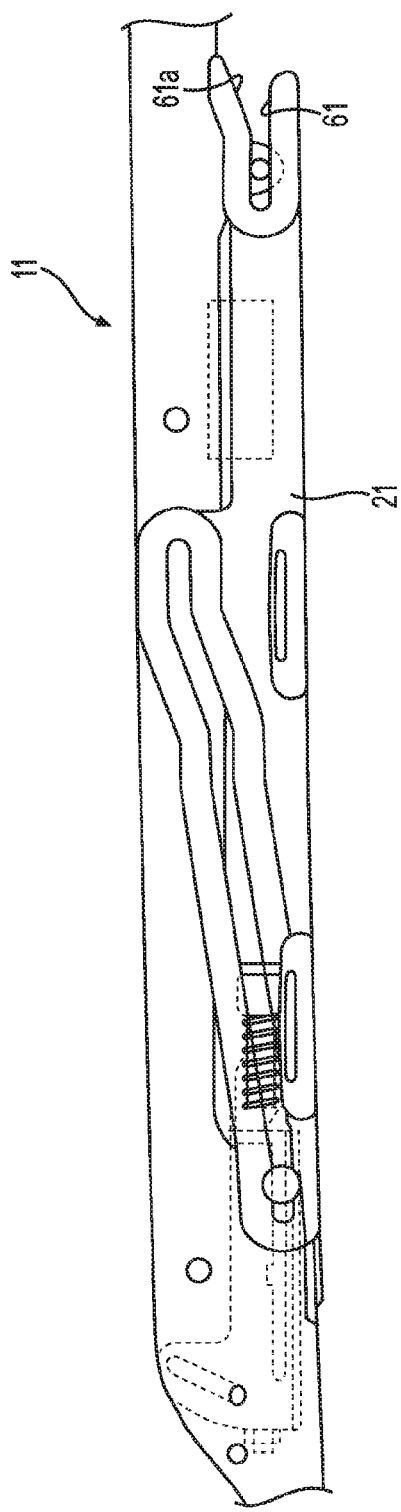
FIG. 1B is an illustration of a component of a sliding apparatus of a sunroof in a venting position.

Sunroof apparatuses available in modern automotive vehicles are comprised of complex mechanical components whose interdependent motion produces the varied sunroof apparatus positions enjoyed by users. In achieving these positions, a variety of approaches to sunroof apparatuses have been deployed In a first example, as described in U.S. patent application Ser. No. 15/716,045 and with reference to FIG. 1A, a sub-assembly of a sliding mechanism of a sunroof apparatus comprises a lever 50 and a shoe 15, wherein, during an opening motion, the lever 50 is coupled with a glass panel and is configured to rotate about a first pin 55 via motion of a second pin 57 and a third pin 59 within a guide block 10 and the shoe 15. Through this rotation about the first pin 55 the link 50 and glass panel, via a bracket, coupled thereto are tilted into a venting position whereby further manipulation may move the glass panel into a fully open position. In this reference, the first pin 55 freely slides within a first channel 17. In a second example, as described in U.S. Pat. No. 8,876,201 and with reference to FIG. 1B, a spoiler-type, or venting, sunroof includes holding portions on a rear end portion of a sliding member. Specifically, a rear end of a drive shoe 21 comprises a substantially U-shaped holding groove 61 opening rearward of an automotive vehicle and inclined so as to extend upward as the upper portion on the opening end side goes rearward, thereby forming a guiding portion 61a. The guiding portion 61a allows a sun roof apparatus 11 to obtain a fully-closed position.

Considered in the context of the above-described references, the present disclosure describes structural modifications for improved function during opening and closing of a sunroof apparatus. Specifically, and in order to improve efficiency in full operation of the sunroof apparatus, two components of the sunroof apparatus are addressed. First, a guiding drive shoe assembly, configured to tilt a glass panel and slide within a guide rail to translate the glass panel towards the rear of the vehicle, is modified to provide rotational control to a drive link of the drive shoe assembly. Second, a rear drive shoe assembly is configured to receive and guide a rear end of a functional bracket such that a fully-closed glass panel can be achieved.

Figure 2:
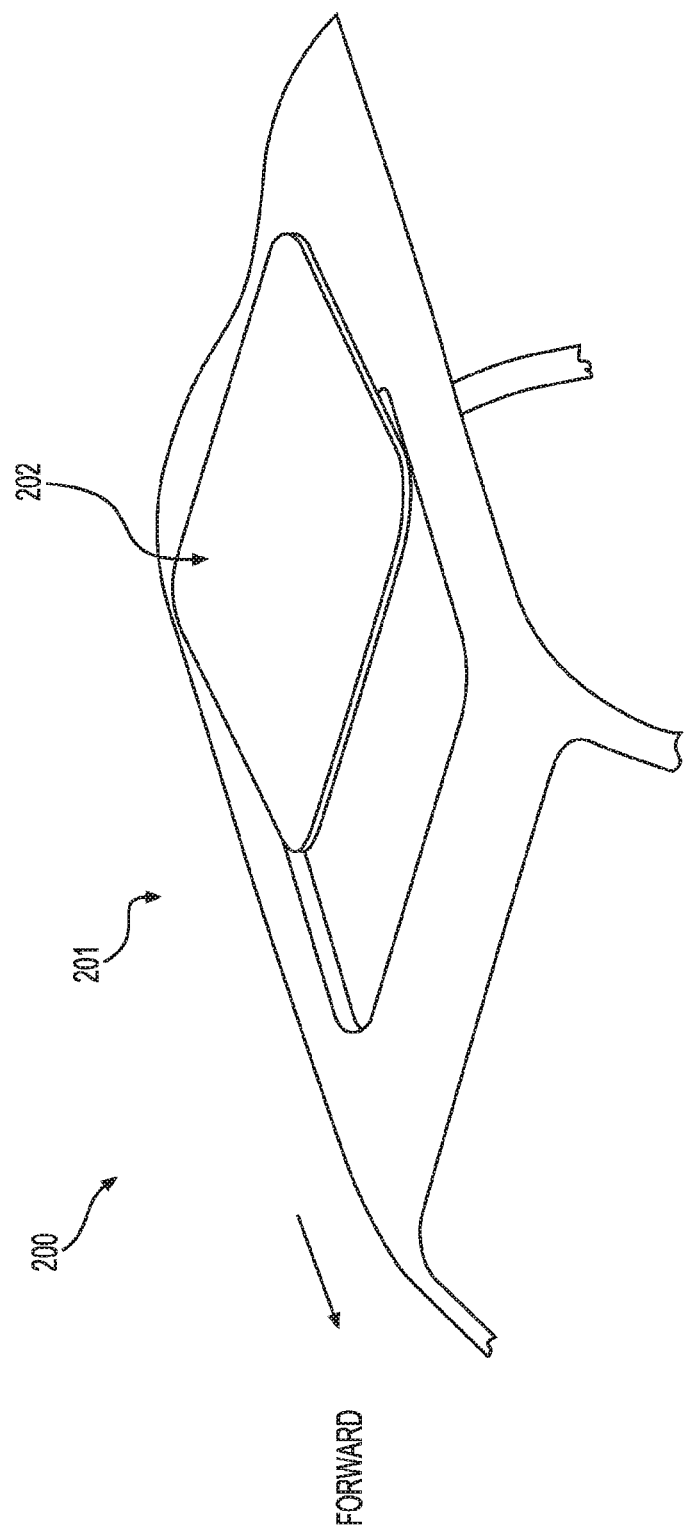
FIG. 2 is a schematic of a sunroof apparatus of an automotive vehicle, according to an exemplary embodiment of the present disclosure.

As background, and in order to orient the reader, FIG. 2 is a schematic of a sunroof apparatus of an automotive vehicle. According to an embodiment, the sunroof apparatus is in a fully-opened position.

Typically, a sunroof apparatus 200 of an automotive vehicle 201 includes a glass panel 202 capable of being tilted into a venting position or being slid relative to a roof of the automotive vehicle 201. In an embodiment, the glass panel 202 slides from the front of the automotive vehicle 201 toward the rear of the automotive vehicle 201. To this end, the glass panel is connected to a sliding mechanism that is configured to move the glass panel 202 from a closed position to a titled position, and finally to a fully-opened position, and vice-versa. Alternatively, in an embodiment, the glass panel 202 is hinged such that the glass panel 202 can directly open without first occupying an intermediate position, such as a tilted position.

During the process of sliding the sunroof apparatus, and the glass panel therein, internal and external environmental conditions may impact the ability of the sunroof apparatus to function optimally. In an example, with the sunroof apparatus in a fully-opened position, a drive link connecting a guiding drive shoe and a bracket coupled to a glass panel may be stressed about a rotation center, wherein rotation of the drive link is minimally constrained. Especially at high-speeds, improving control of forces applied to the drive link about the rotation center may improve efficiency and durability of the component. With respect to a closed position, and in an example, forming an air-tight seal between a glass panel coupled to a bracket and a glass panel seal surrounding the trim of a sunroof apparatus housing relies on movement of a guiding drive shoe and guide channels therein, a state difficult to achieve especially during high-speed operation. An inability to achieve an air-tight, fully closed position creates a noise concern for cabin occupants.

With respect for brevity, the below-described embodiments of the present disclosure are non-limiting examples and, as can be appreciated, components other than those explicitly described may be required for implementation, as would be understood by one of ordinary skill in the art.

Opening Operation of Sunroof Apparatus

Figure 4A:
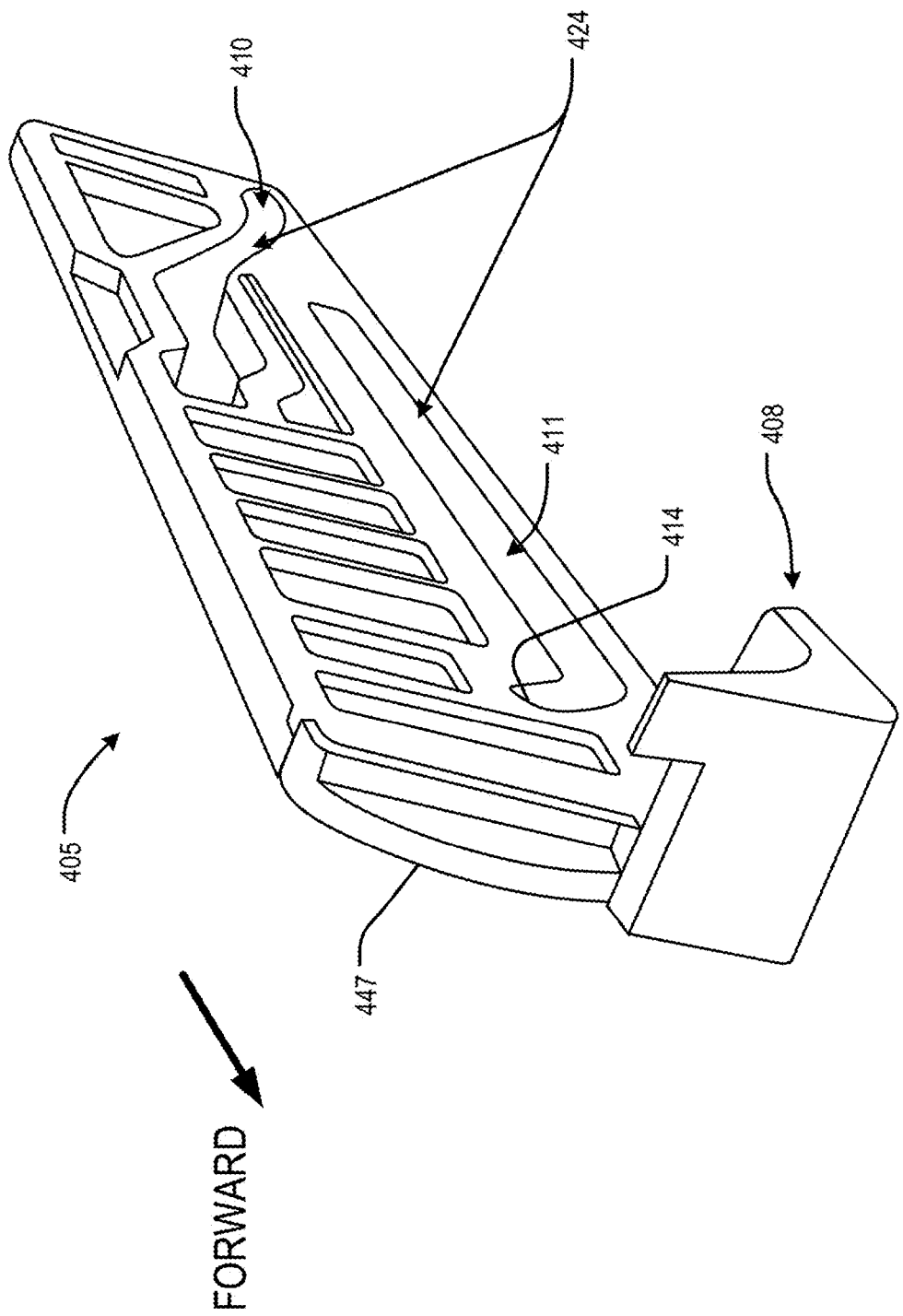
FIG. 4A is an illustration of a guiding drive shoe of a guiding drive shoe assembly of a sunroof apparatus, according to an exemplary embodiment of the present disclosure.

In addressing the above-described limitations, the present disclosure first describes a guiding drive shoe having a constraining portion for alleviating undo stresses, or binding, on a drive link. FIG. 3 is a schematic of a guiding drive shoe 305 of a guiding drive shoe assembly 304 of a sunroof apparatus. The guiding drive shoe 305 includes a forward end 347 and a rearward end 348. In an embodiment, the guiding drive shoe 305 is operably-coupled to a drive link 306, the drive link 306 being operably-coupled to a guide block 307. The drive link 306 may be operably-coupled to the guiding drive shoe 305 via one or more pins slidably-coupled within one or more guide channels of the guiding drive shoe 305. In an embodiment, the drive link 306 has a forward portion 309 and a rear portion 349. A constrained portion, further described in FIG. 4A, is disposed at the forward portion 309 of the drive link 306, wherein the forward portion 309 of the drive link 306 is oriented towards the front of the automotive vehicle. In an embodiment, the constrained portion is constrained by a constraining portion 308 disposed at the forward end 347 of the guiding drive shoe 305.

During operation of the sunroof apparatus, moving from a closed position to a fully-opened position, the guiding drive shoe 305 is driven along a guide rail of the sunroof apparatus, the guide rail being oriented along an axis substantially parallel to a plane of a roof of the automotive vehicle. The guiding drive shoe 305 is driven, for example, by a motor (not shown) including, among others, an electric motor. As shown in FIG. 4A, when translating the guiding drive shoe 405 during sunroof apparatus operation, from the fore of the automotive vehicle aft, a drive link slides within one or more guide channels 424 of the guiding drive shoe 405. In an embodiment, a first pin of one or more pins of the drive link is slidably-coupled within a first guide channel 410 of the one or more guide channels 424 and a second pin of the one or more pins of the drive link is slidably-coupled within a second guide channel 411 of the one or more guide channels 424. Upon nearing a fully-opened position, the drive link abuts a constraining portion 408 at a forward end 447 of the guiding drive shoe 405. In an embodiment, the constraining portion 408 is configured for constraining a forward portion of the drive link such that, as the second pin of the drive link approaches an apex of the second guide channel 411, a constrained portion of the drive link contacts the constraining portion 408 of the guiding drive shoe 405 and rotation of the drive link, therein, is controlled.

Figure 4B:
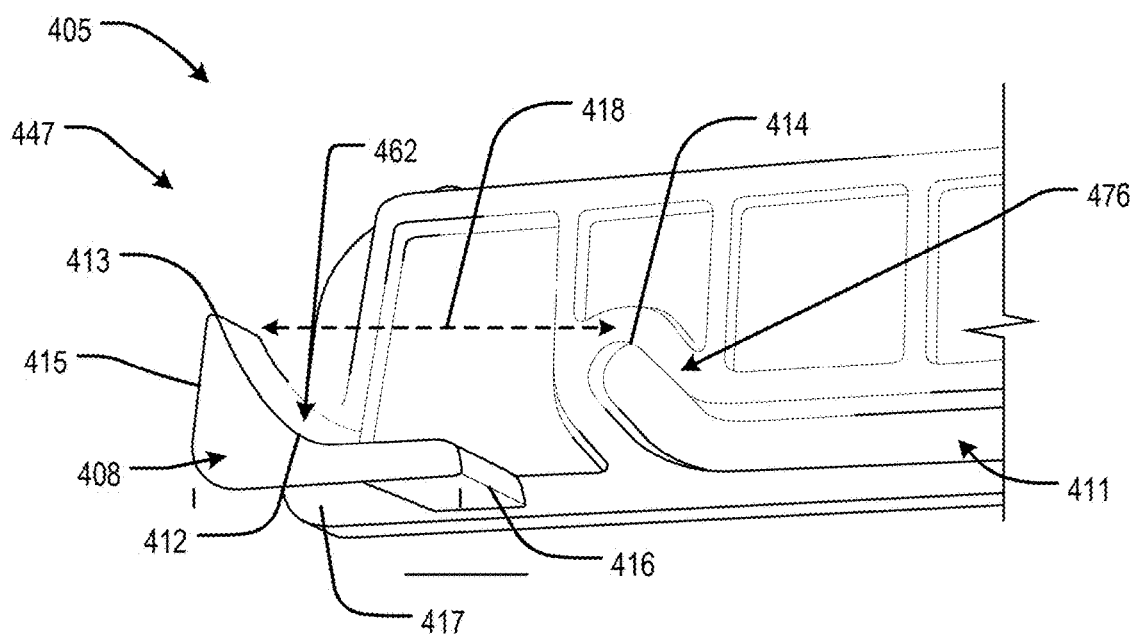
FIG. 4B is a schematic of a front end of a guide shoe of a guiding drive shoe assembly of a sunroof apparatus, according to an exemplary embodiment of the present disclosure.

In an embodiment, and as shown in FIG. 4B, the forward end 447 of the guiding drive shoe 405 is configured such that rotation of the drive link, about a rotation center, is controlled. To this end, the forward end 447 of the guiding drive shoe 405 includes a forward end of the second guide channel 411 and the constraining portion 408. An apex of the constraining portion 413 and an apex of the second guide channel 414 are separated by an inter-apex distance 418. In an embodiment, the inter-apex distance 418 is defined by a dimension of a constrained portion of the drive link, wherein the dimension of the constrained portion of the drive link is determined such that an estimated force is sustained during operation of the sunroof apparatus. In another embodiment, the inter-apex distance 418 is determined based upon a distance from the apex of the second guide channel 414 to a rearward end of the drive link, wherein the inter-apex distance is a pre-determined fraction of the distance from the apex of the second guide channel 414 to the rearward end of the drive link.

In an embodiment, the constraining portion 408 of the forward end 447 of the guiding drive shoe 405 is defined by a first dimension 415, a second dimension 416, and a third dimension 417, wherein the first dimension 415 is related to the apex of the constraining portion 413, the second dimension 416 is related to a width of the constrained portion of the drive link, and the third dimension 417 is related, in part, to the inter-apex distance 418. In an example, the third dimension 417 is equal to a third dimension of the constrained portion of the drive link. Further, an abutting surface 462 is configured for contact with, and guiding of, the constrained portion of the drive link. In an embodiment, the abutting surface 462 is defined by one or more curvatures 412, wherein the one or more curvatures 412 are configured to guide the constrained portion of the drive link. In an embodiment, the one or more curvatures 412 of the abutting surface 462 are congruent with one or more curvatures of an incline 476 of the second guide channel 411 of the guiding shoe drive 405, such that a movement of the second pin of the drive link travels along a similar path to the apex 413 of the constraining portion 408.

In an embodiment, the constraining portion 408 of the forward end 447 of the guiding drive shoe 405 is formed integrally with the guiding drive shoe 405. The guiding drive shoe 405 and constraining portion 408 therein are fabricated via a method selected from a group including milling, machining, cutting, forming, molding, and the like, from a material selected from a group including metallic materials and non-metallic materials such as steel, cast iron, aluminum, plastic, and the like.

Figure 4C:
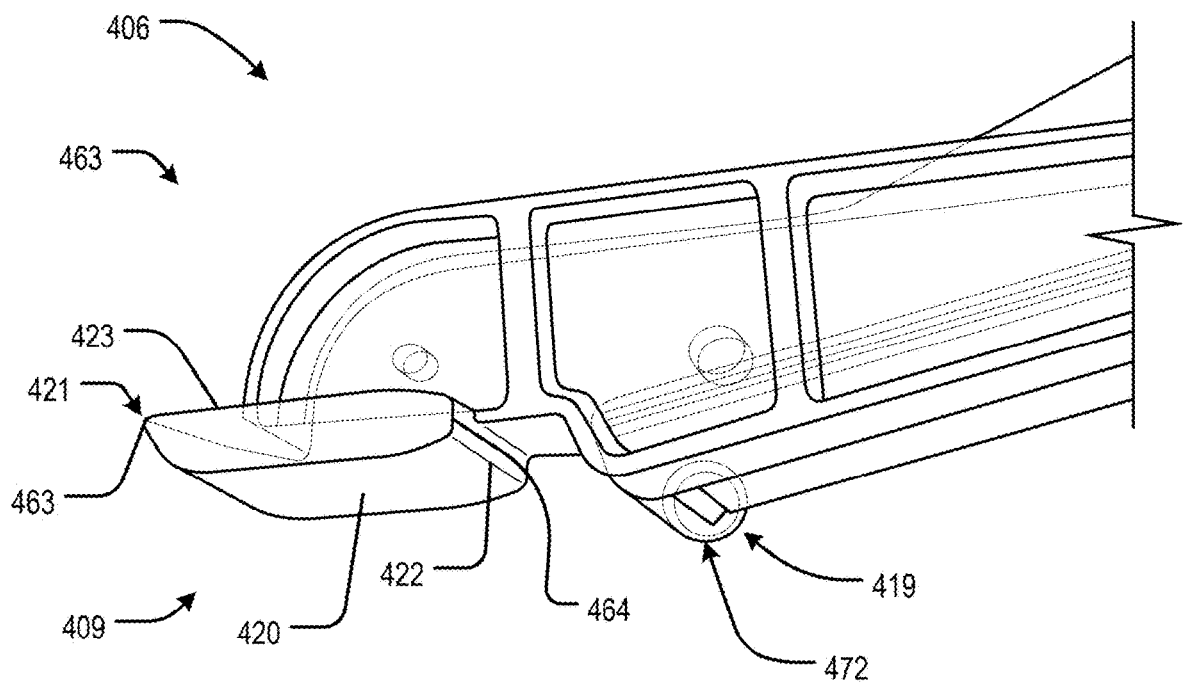
FIG. 4C is a schematic of a front end of a drive link of a guiding drive shoe assembly of a sunroof apparatus, according to an exemplary embodiment of the present disclosure.

In an embodiment, the features of the above-described constraining portion 408 of the guiding drive shoe 405 are determined according to the structure and dimensions therein of a drive link 406, as shown in FIG. 4C. A front portion of the drive link 409 includes a constrained portion 420 having a first dimension 463, a second dimension 422 and a third dimension 423, wherein the first dimension 464 is a thickness of the constrained portion 420 determined such that appropriate torsional forces are sustained, the second dimension 422 is a width of the constrained portion 420, and the third dimension 423 is a length of the constrained portion 420, the length of the constrained portion 420 being related to a distance between a rotation center 472, about a second pin 419, and a forward position on the front portion of the drive link 463. In an example, the first dimension 464, the second dimension 422, and the third dimension 423 are determined such that a force applied to a glass panel, coupled to the drive link 406 via a bracket, are sustained when the sunroof apparatus is in a fully-opened position. In an embodiment, and during translation of the drive link 406 resulting in rotation of the drive link 406 about the rotation center 472, the constrained portion 420 contacts the constraining portion of the guiding drive shoe. To facilitate contact between these components, an abutting surface of the constrained portion 420 of the drive link 406 is defined by one or more curvatures 421, the one or more curvatures 421 being configured for smooth contact between the drive link 406 and the abutting surface of the constraining portion of the guiding drive shoe. In an example, the one or more curvatures 421 of the constrained portion 420 of the drive link 406 are equivalent to the one or more curvatures 412 of the constraining portion 408 of the guiding drive shoe 405.

According to an embodiment, and as shown in FIG. 5A through FIG. 5C, during operation of the sunroof apparatus, the constraining portion of the guiding drive shoe comes into contact with the constrained portion of the drive link in order to control rotation of the drive link about the rotation center. As shown in FIG. 5A, a first position 525 of a drive link 506 relative to a guiding drive shoe 505, a second pin 519 of the drive link 506 is positioned within a second guide channel of the guiding drive shoe 505. As the second pin 519 of the drive link 506 approaches an incline 576 of the second guide channel, a constrained portion 520 of the drive link 506 makes initial contact with a constraining portion 508 of the guiding drive shoe 505. As initial contact is made between the constrained portion 520 and the constraining portion 508, a relationship between a longitudinal axis of the drive link 506 and a longitudinal axis of the guiding drive shoe 505 is formed and defined as a drive link angle 573, or Θ. In an embodiment, the drive link angle 573 is between 2° and 25°. In an example, the drive link angle 573 is 10°. As the guiding drive shoe 505 is translated, the position of the drive link 506 relative to an apex of the second guide channel changes, as shown in FIG. 5B, such that the drive link 506 is moved into a second position relative to the guiding drive shoe 505. As the second pin 519 of the drive link 506 begins an ascent of the incline 576 of the second guide channel, towards the apex of the second guide channel, an abutting surface of the constrained portion 520 of the drive link, defined by one or more curvatures, follows an abutting surface of the constraining portion 508 of the guiding drive shoe. In following a guiding surface of the abutting surface of the constraining portion 508, the drive link angle is maintained while reducing stress about the second pin of the drive link. When the sunroof apparatus has reached a third position, or a fully-opened state 570, as shown in FIG. 5C, the second pin 519 has reached the apex of the second guide channel and a forward position 563 of the constrained portion 520 of the drive link reaches an apex 513 of the constraining portion 508. In an embodiment, in the third position, the second pin 519 of the drive link is a rotation center 572. Unlike traditional approaches, wherein the drive link lacks a constrained portion and is free to rotate about the rotation center, the drive link of FIG. 5C is constrained by contact between the constrained portion 520 of the drive link and the constraining portion 508 of the guiding drive shoe, thus preventing aft-rotation 529 of the drive link on a first side of the rotation center and, consequently, fore-rotation 528 of the drive link about a second side of the rotation center.

As suggested, unlike the controlled translation of the drive link of the above-described process, traditionally, a rotation center of a drive link, lacking a constraint mechanism, is located at a pin disposed at a forward end of the drive link and a drive link angle is maintained through a position of a guiding drive shoe relative to the drive link, and the position of the pin relative to an apex of a second guiding channel, therein. As a result, the drive link angle may be influenced by environmental factors that strain the drive link, resulting in fluctuations of the drive link angle or increased forces within the drive link. As described in the present disclosure, and illustrated in a closed- to fully-opened-embodiment of FIG. 5A through FIG. 5C, the constrained portion of the drive link relieves stresses from the drive link while ensuring a consistent drive link angle, thus impacting longevity of the drive link.

Closing Operation of Sunroof Apparatus

Figure 6:
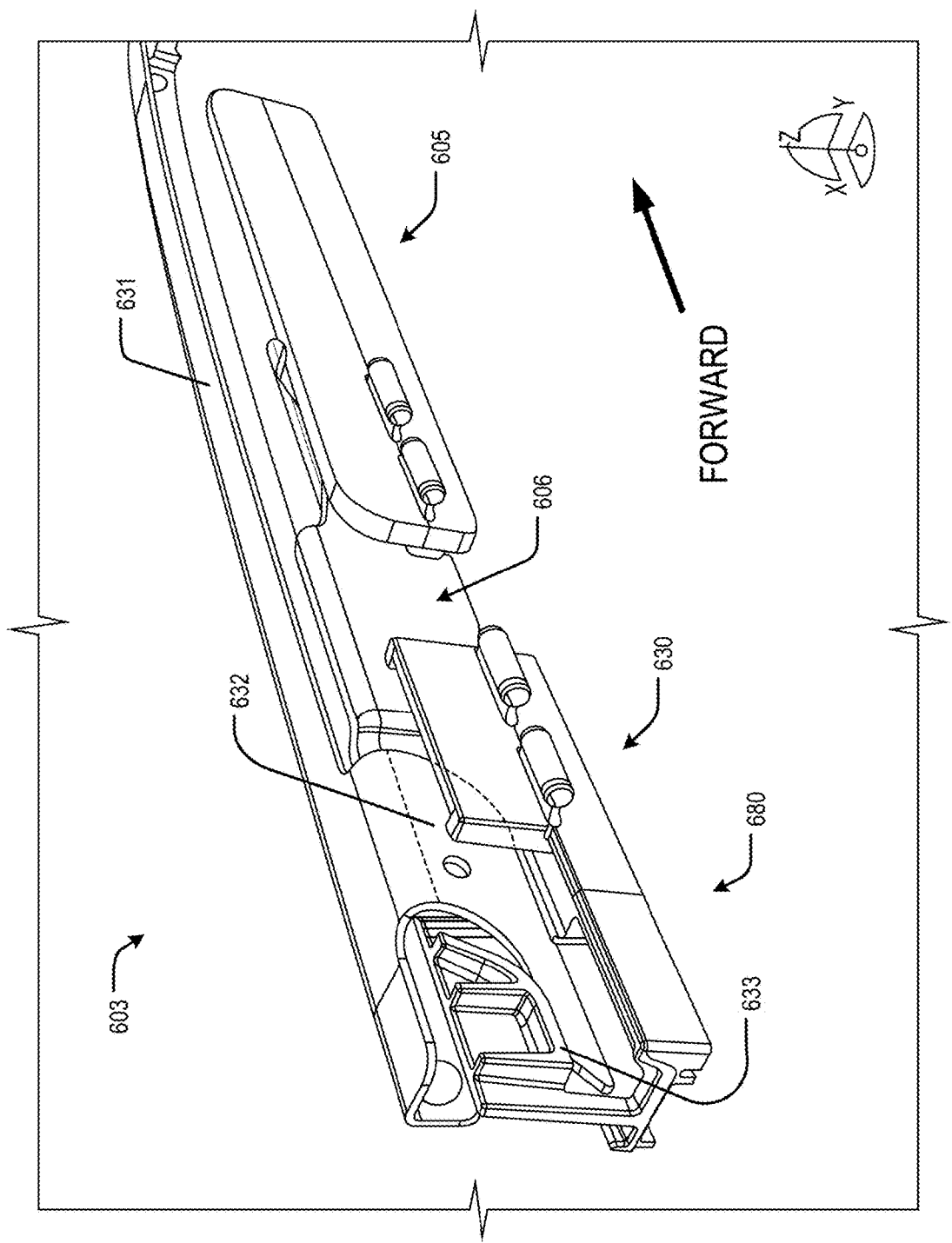
FIG. 6 is an illustration of a rear drive shoe assembly of a sunroof apparatus, according to an exemplary embodiment of the present disclosure.

Upon user request, the sunroof apparatus of the automotive vehicle may enter a closing operation. Traditionally, a closing operation of the sunroof apparatus would proceed as an inverse operation of an opening operation, driven solely by a guiding drive shoe. During high-speed operation, however, such as, for example, during highway driving, a closing operation may be stymied by environmental factors including air resistance and the like. To this end, FIG. 6 is an illustration of a portion of a sunroof apparatus having a sliding mechanism and a rear drive shoe assembly, therein. In an embodiment, a rear drive shoe assembly 680 of a sliding mechanism 603 includes a rear drive shoe 630 and a rear bracket 632, referred to herein as a functional bracket, coupled to a bracket 631, the bracket 631 being configured to be coupled to a glass panel of the sunroof apparatus. In order to couple motion of the functional bracket 632 to motion of a guiding drive shoe 605, a drive link 606 is operably-coupled to the functional bracket 632 of the bracket 631. During a closing operation, the guiding drive shoe 605, and the drive link 606 operably-coupled thereto, are translated toward the fore of an automotive vehicle, moving the glass panel from a third position to a first position, or from an opened position to a fully-closed position. Concurrently, the rear drive shoe 630, having a guiding portion 633, is translated toward the fore of the automotive vehicle such that the guiding portion 633 of the rear drive shoe 630 may contact an abutting surface of the functional bracket 632 of the bracket 631. In an embodiment, translation of the guiding drive shoe 605 and the rear drive shoe 630 is driven, for example, by a motor (not shown) including, among others, an electric motor. Moreover, contact of the guiding portion 632 of the rear drive shoe 630 with the abutting surface of the functional bracket 632 guides the functional bracket 632 and bracket 631 coupled thereto, into a fully-closed position, sealing the glass panel with a roof the automotive vehicle.

Figure 7A:
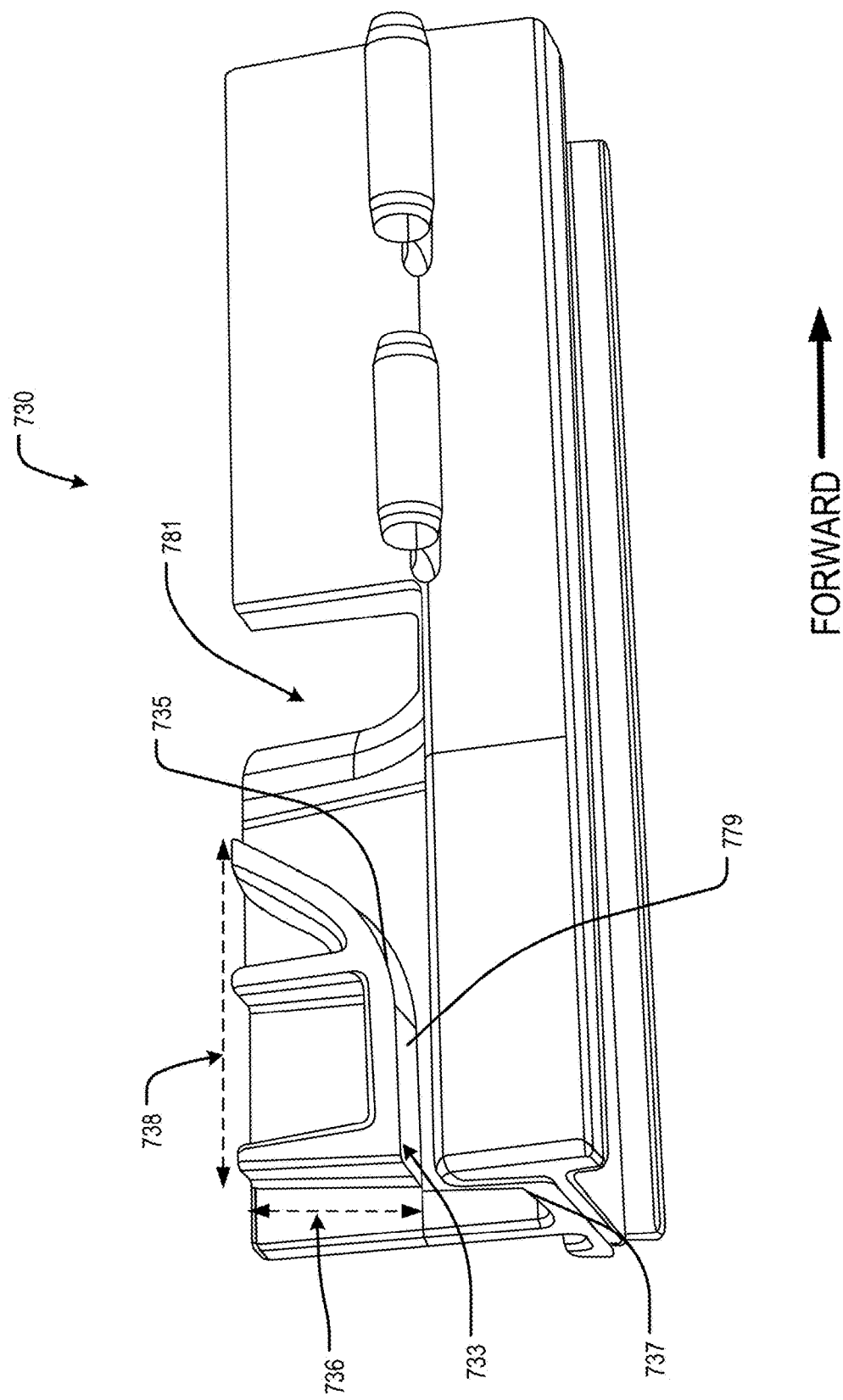
FIG. 7A is a schematic of a rear drive shoe of a rear drive shoe assembly of a sunroof apparatus, according to an exemplary embodiment of the present disclosure.

According to an embodiment, and as alluded to above, the guiding portion of the rear drive shoe is configured to contact and guide the functional bracket of the bracket such that the glass panel of a sunroof apparatus is moved into a fully-closed position. To this end, FIG. 7A is a schematic of a rear drive shoe 730 of a rear drive shoe assembly. In an embodiment, the rear drive shoe 730 includes a rear bracket slot 781, referred to herein as a functional bracket slot, defined by a space between a wall of the rear drive shoe 730, a floor of the rear drive shoe 730, and a guiding portion 733, the guiding portion 733 having a curvature 735 for contact with an abutting surface of a functional bracket of a bracket. In an embodiment, the functional bracket slot 781 is defined relative to a first dimension 736 of the rear drive shoe 730, the first dimension 736 being a variable dimension according to a guiding surface 735 of the guiding portion 733, a second dimension 737 of the rear drive shoe 730, and a third dimension 738 of the rear drive shoe 730, the third dimension 738 being a dimension of the guiding portion 733. In an example, the first dimension 736, a variable dimension, for instance, is determined according to a corresponding dimension of the functional bracket, such that contact between a guiding surface 779, defined by the guiding surface 735, of the guiding portion 733 and a guided surface of the functional bracket is smooth. In an example, the second dimension 737 is a width of the floor of the rear drive shoe 730 and corresponds, at least, to a corresponding dimension of the functional bracket. In an example, the third dimension 738 is a length of the guiding portion 733 of the rear drive shoe 730, defined, in part, by the guiding surface 735 of the guiding portion 733 and in accordance with a corresponding dimension of the functional bracket. Determination of each of the above-described dimensions is performed within mechanical constraints of the automotive vehicle, wherein the mechanical constraints require minimum levels of mechanical strength of the components of the rear drive shoe assembly. It can be appreciated that the above-described dimensions are non-limiting examples and can be modified according to specific implementations and automotive vehicle requirements.

In an embodiment, the guiding portion 733 of the rear drive shoe 730 is formed integrally with the rear drive shoe 730. The rear drive shoe 730 and the guiding portion 733 therein are fabricated via a method selected from a group including milling, machining, cutting, forming, molding, and the like, from a material selected from a group including metallic materials and non-metallic materials such as steel, cast iron, aluminum, plastic, and the like.

Figure 7B:
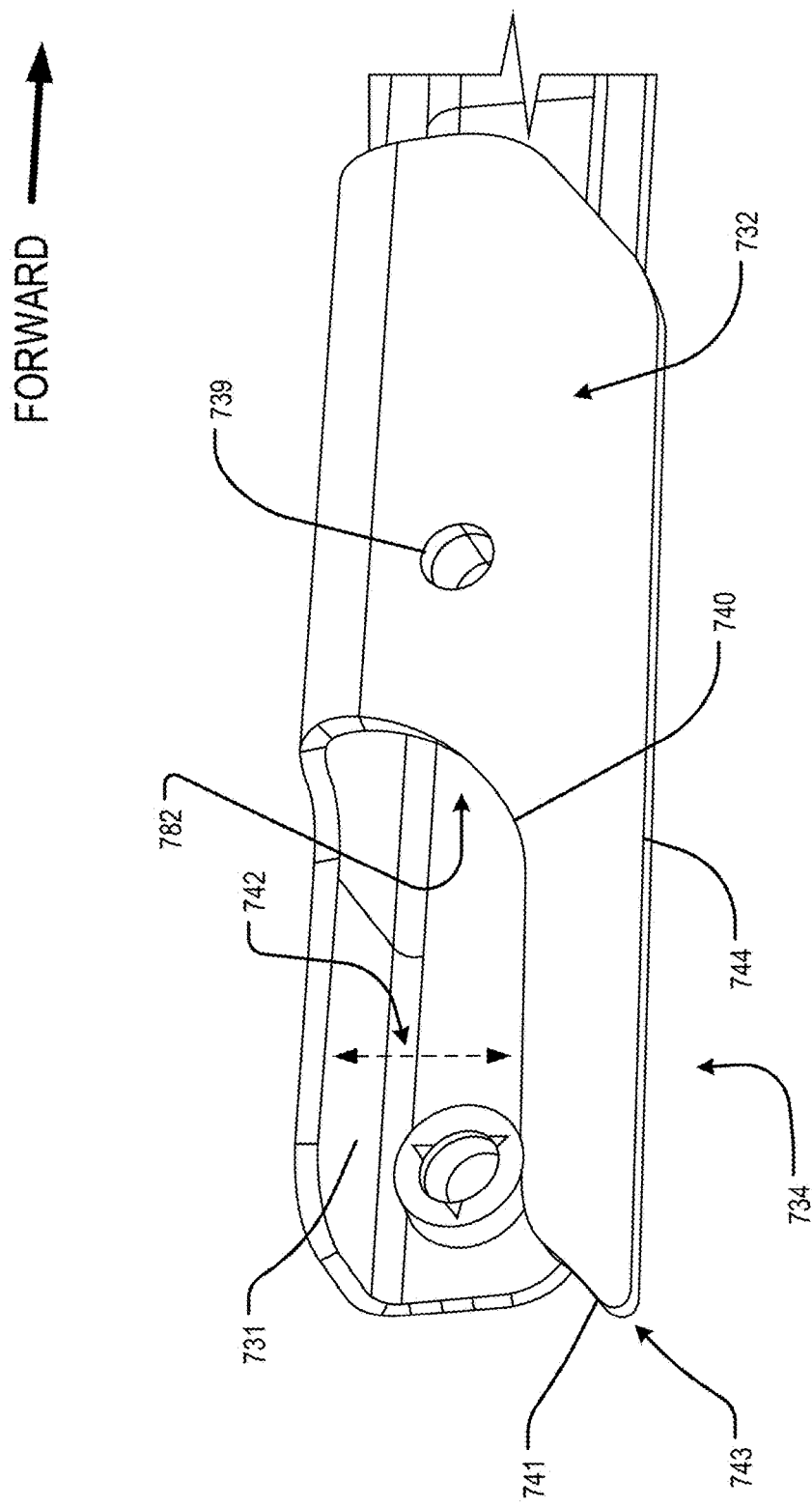
FIG. 7B is a schematic of a functional bracket of a bracket of a rear drive shoe assembly of a sunroof apparatus, according to an exemplary embodiment of the present disclosure.

As suggested, the rear drive shoe and guiding portion therein are configured to contact and guide the functional bracket of the bracket during a closing operation. To this end, FIG. 7B is a schematic of a functional bracket 732 of a bracket 731 of the present disclosure. In an embodiment, the functional bracket 732 has a guided portion 734 and is disposed at an aft end of the bracket 731, the bracket 731 being coupled to a glass panel of a sunroof apparatus. The guided portion 734 of the functional bracket 732 is defined by a first dimension 742, a second dimension 743, and a third dimension 744. In an example, the first dimension 742 of the guided portion 734 corresponds to the first dimension of the rear drive shoe defining a dimension of the guiding portion of the rear drive shoe. Specifically, the first dimension 742 defines a distance between a surface of the bracket 731 and a surface of the guided portion 734 of the functional bracket 732, wherein the surface of the guided portion 734 is defined by one or more curvatures. The one or more curvatures of the surface of the guided portion 734 of the functional bracket 732 define an abutting surface 741 and a guided surface 740. The abutting surface 741 of the guided portion 734 is configured such that contact with the guiding portion of the rear drive shoe pushes the guided portion 734, and glass panel connected thereto, in a downward direction. Subsequently, the guided surface 740 of the guided portion 734 is configured such that contact with the guided portion of the rear drive shoe guides the guided portion 734, and glass panel connected thereto, into a fully-closed position. The second dimension 743 defines a width of the guided portion 734 and is determined according to an expected stress applied to the functional bracket 732 during operation. Therefore, the second dimension 743 of the guided portion 734 of the functional bracket 732 is selected such that minimum levels of mechanical strength, in context of estimated mechanical constraints, are met. The third dimension 744 of the guided portion 734 defines a length of the guided portion 734 of the functional bracket 732. In an example, the third dimension 744 may be a variable length along the first dimension 742 of the guided portion 734 of the functional bracket 732 such that the functional bracket 732 is of varying lengths from a bottom of the functional bracket 732 to a top of the functional bracket 732. In order to allow for a fully-closed sunroof apparatus, the third dimension 744 of the guided portion 734 is at least equal to the third dimension of the guiding portion of the rear drive shoe.

During operation, as the guided portion 734 of the functional bracket 732 is guided into the functional bracket slot of the rear drive shoe, the guiding portion of the rear drive shoe moves into a rear drive shoe slot 782 of the functional bracket 732, the rear drive shoe slot 782 being configured to receive the guiding portion of the rear drive shoe and an aft end of a drive link. In an embodiment, the drive link is coupled to the functional bracket 732 via one or more through holes 739. The coupling is accomplished, for example, via bolt and nut mechanism. In coupling the drive link to the functional bracket 732 via the one or more through holes 739, a translation of a guiding drive shoe results in a change in the position of the bracket 731 of the rear drive assembly and thus, a change in the status of the glass panel of the sunroof mechanism.

In an embodiment, the functional bracket 732 of the bracket 731 is formed integrally with the bracket 731. The bracket 731, and the functional bracket 732 coupled thereto, is fabricated via a method selected from a group including milling, machining, cutting, forming, molding, and the like, from a material selected from a group including metallic materials and non-metallic materials such as steel, cast iron, aluminum, plastic, and the like.

By combining the rear drive shoe of FIG. 7A with the functional bracket of FIG. 7B, it is possible to achieve a fully-closed position of the glass panel of the sunroof apparatus, including during high-speed operation, as would be found, for example, during highway travel. It should be appreciated that, though the below-described closing operation reflects a closing operation beginning from an opened position, the same processes can be applied to a sunroof apparatus in a tilted-up position or any other intermediary position between an opened position and a fully-closed position.

Figure 8A:
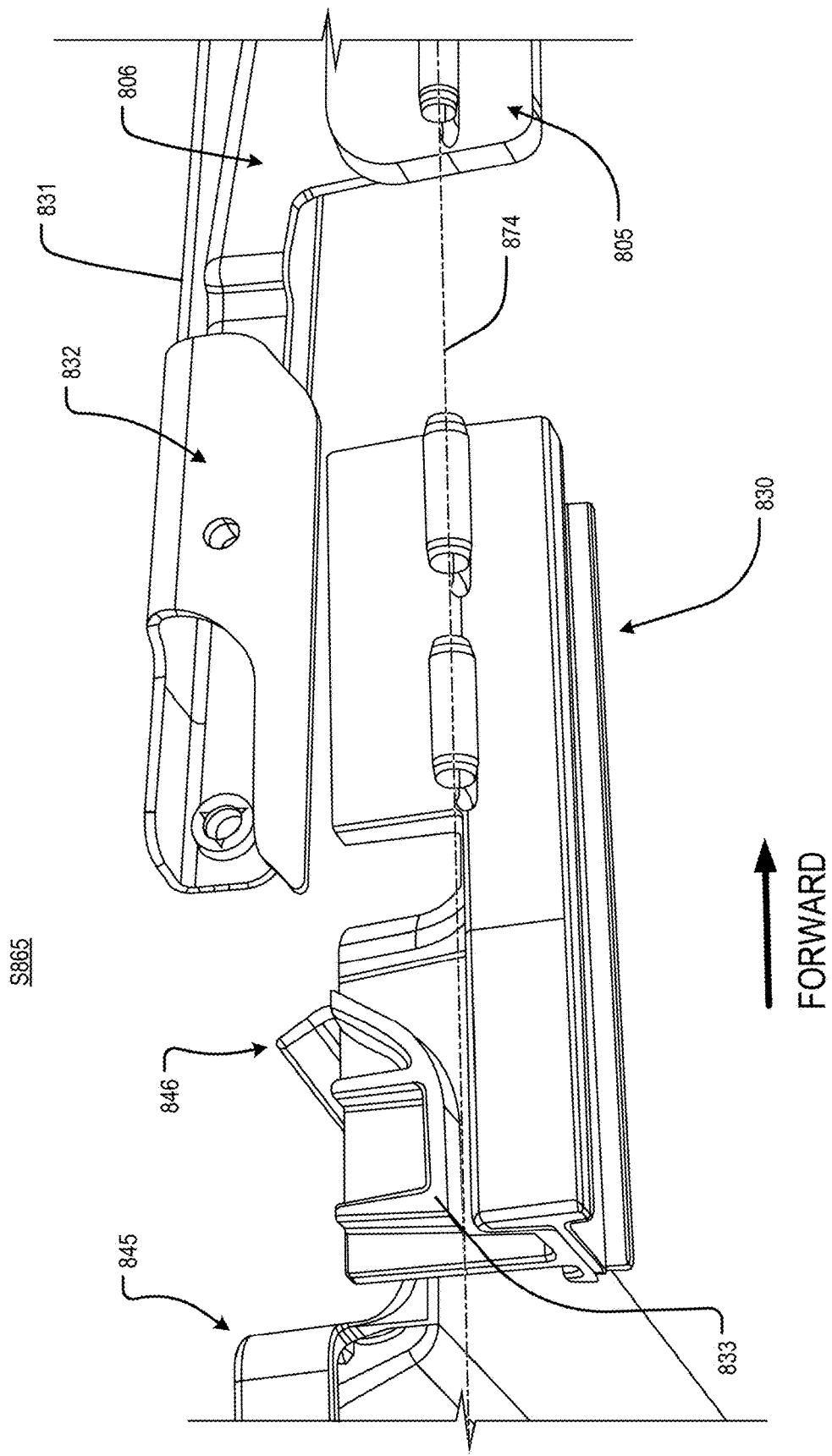
FIG. 8A is an illustration of a first position of a functional bracket of a bracket of a rear drive shoe assembly of a sunroof apparatus, according to an exemplary embodiment of the present disclosure.

To this end, FIG. 8A through FIG. 8D is a graphical flowchart of a closing operation of a glass panel of a sunroof apparatus following a user command. Generally, with reference to FIG. 8A, a guiding drive shoe 805 is operably-coupled to a drive link 806 via one or more pins. The drive link 806 is further coupled to a functional bracket 832 of a bracket 831, the bracket 831 being configured to hold the glass panel of the sunroof apparatus. In an embodiment, the functional bracket 832 of the bracket 831 is configured for contact with a guiding portion 833 of a rear shoe drive 830. According to an embodiment, the above-described components are operably-coupled to a sunroof apparatus housing 845, the sunroof apparatus housing 845 further comprising a glass panel seal 846 for ensuring an air-tight seal between the glass panel and a roof of the automotive vehicle during a closing operation. Specifically, however, FIG. 8A describes a first position S865, wherein a closing operation has been initiated. In an embodiment, in the first position S865, the guiding drive shoe 805 and the rear drive shoe 830, components of a sliding mechanism, are translated along a travel axis 874 via one or more motors (not shown) toward the fore of an automotive vehicle. In an embodiment, the guiding drive shoe 805 and the rear drive shoe 830 are translated independently according to an action of a corresponding one of the one or more motors. In an example, the guiding drive shoe 805 and the rear drive shoe 830 are translated via a single motor controlled by a sunroof apparatus control device in order to translate the guiding drive shoe 805 and the rear drive shoe 830 along the travel axis. In the first position S865, an angular relationship between a longitudinal axis of the drive link 806 and a longitudinal axis of the guiding drive shoe 805 is a drive link angle. During the closing operation, the drive link angle is substantially maintained until an axis of a second guide channel of the guiding drive shoe 805 becomes substantially askew of the longitudinal axis of the guiding drive shoe 805. As shown in FIG. 8A, the sunroof apparatus has begun moving from a tilted position toward a fully-closed state, wherein the drive link angle decreases in tandem with the proximity of the functional bracket 832 to the rear drive shoe 830.

Figure 8B:
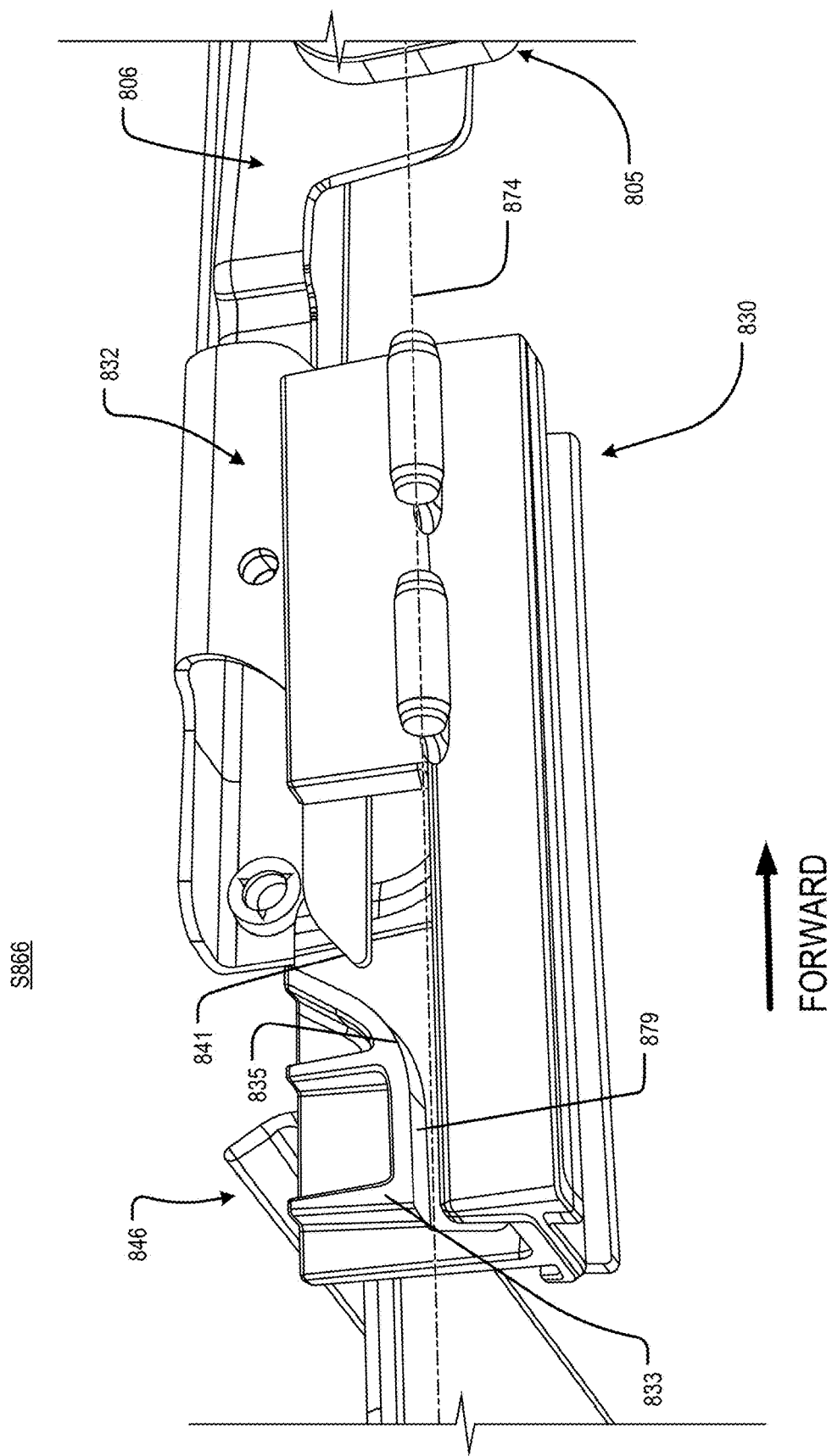
FIG. 8B is an illustration of a second position of a functional bracket of a bracket of a rear drive shoe assembly of a sunroof apparatus, according to an exemplary embodiment of the present disclosure.

FIG. 8B illustrates a second position S866 of the closing operation, wherein the drive link angle is decreased such that, under calm environmental conditions, the glass panel may move into a fully-closed position. Under high-speed operation, however, the proximity of the functional bracket 832 to the glass panel seal 846 may be such that a fully-closed position is not attainable. In the second position S866, as the guiding drive shoe 805 and rear drive shoe 830 continue forward translation along the travel axis 874, an abutting surface 841 of a guided portion of the functional bracket 832 contacts a guiding surface 879 of a guiding portion 833 of the rear drive shoe 830. According to a guiding surface 835 of the guiding portion 833 of the functional bracket 832, the abutting surface 841 is guided down. Following contact of the functional bracket 832 with the guiding portion 833 of the rear drive shoe 830, the drive link angle of the drive link 806 is further decreased in an effort to create an air-tight seal of the glass panel with the glass panel seal 846. In an embodiment, contact of the functional bracket 832 with the guiding portion 833 of the rear drive shoe 830 results in rotation of the drive link 806 about one of the one or more pins slidably-coupled to the guiding drive shoe 805. In an example, movement of the drive link 806 in response to contact between the functional bracket 832 and the guiding portion 833 of the rear drive shoe 830 is purely rotational about one of the one or more pins.

Figure 8C:
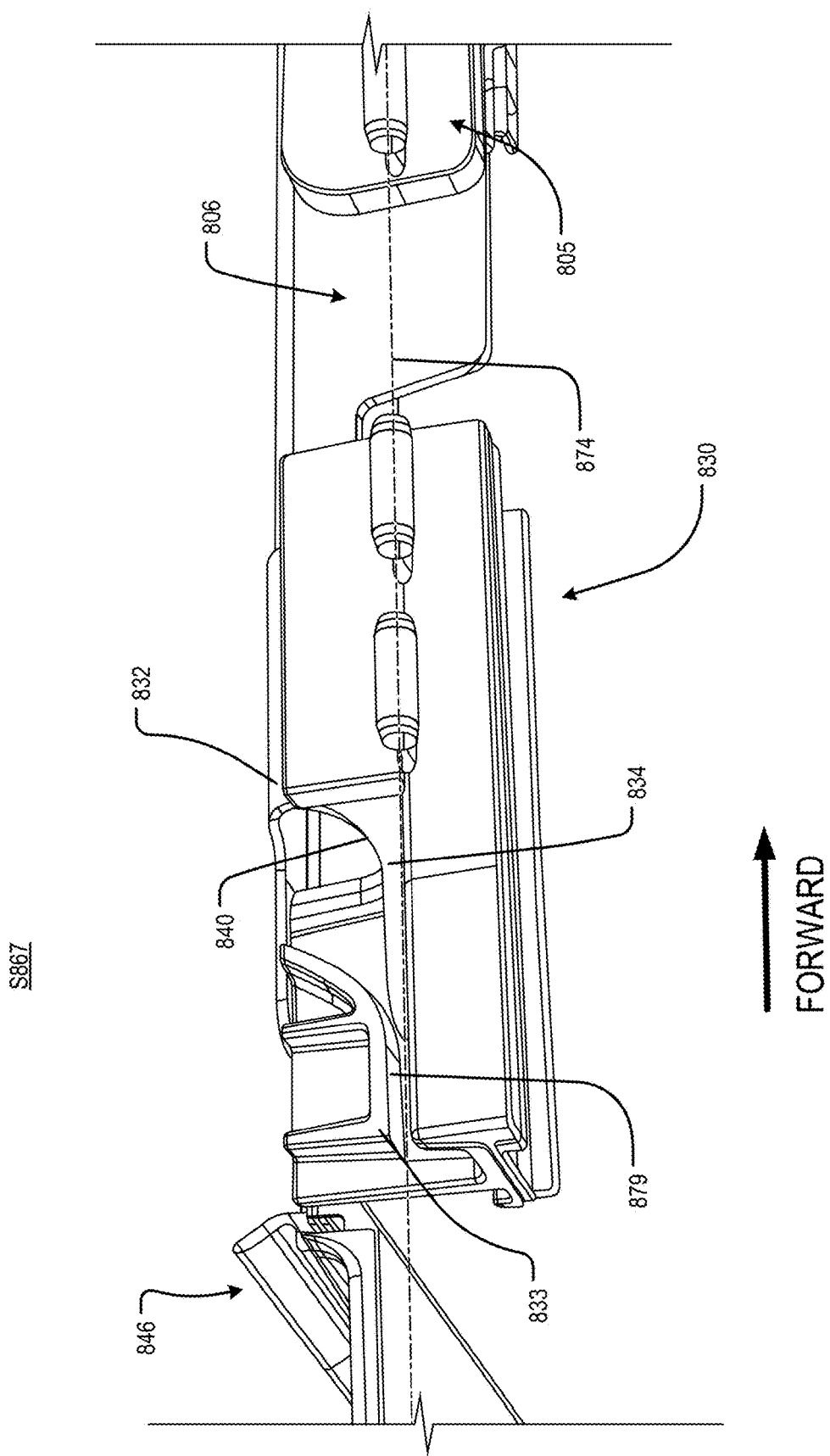
FIG. 8C is an illustration of a third position of a functional bracket of a bracket of a rear drive shoe assembly of a sunroof apparatus, according to an exemplary embodiment of the present disclosure.

FIG. 8C illustrates a third position S867 of the closing operation wherein, as a result of contact between the guiding portion 833 of the rear drive shoe 830 and the guided portion 834 of the functional bracket 832, the drive link angle of the drive link 806 is substantially decreased. In an embodiment of the third position S867, as forward translation of the guiding drive shoe 805 and the rear drive shoe 830 continues along the travel axis 874, the guiding surface 879 of the guiding portion 833 of the rear drive shoe 830 comes into contact with a guided surface 840 of the guided portion 834 of the functional bracket 832. This contact guides the functional bracket 832 into a functional bracket slot of the rear drive shoe and, concurrently, the guiding portion 833 of the rear drive shoe 830 into a rear drive shoe slot of the functional bracket 832. As translation of the rear drive shoe 830 and guiding drive shoe 805 continues, the drive link angle further decreases as the guiding portion 833 of the rear drive shoe guides the functional bracket 832 downward, bringing the associated glass panel into close proximity with the glass panel seal 846.

Figure 8D:
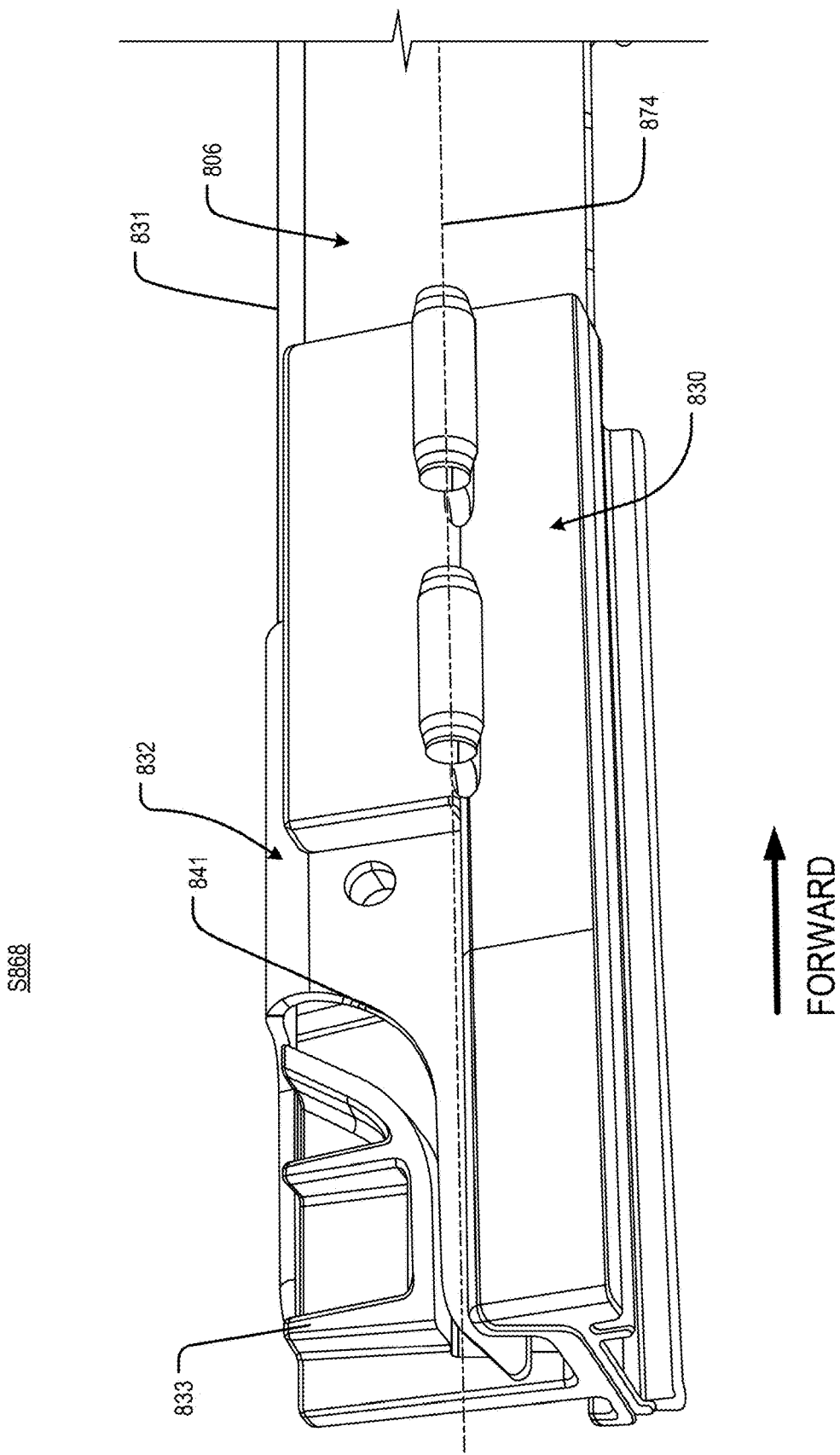
FIG. 8D is an illustration of a fourth position of a functional bracket of a bracket of a rear drive shoe assembly of a sunroof apparatus, according to an exemplary embodiment of the present disclosure.
Figure 9:
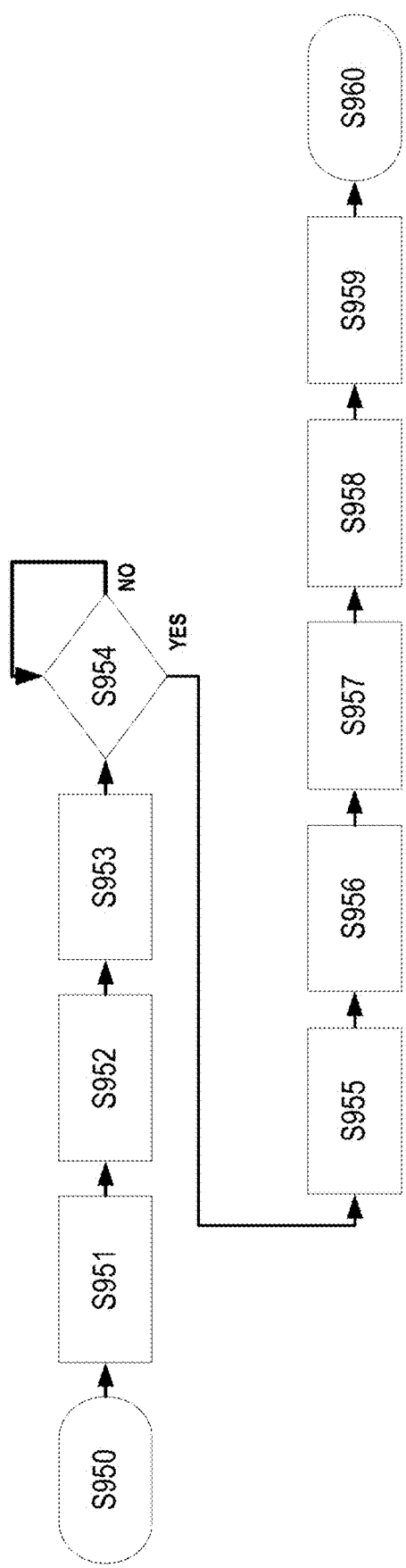
FIG. 9 is a flowchart of operation of a sunroof apparatus employing a guiding drive shoe assembly and a rear drive shoe assembly, according to an exemplary embodiment of the present disclosure.

To this end, FIG. 8D illustrates a fourth position S868 of the closing operation wherein the functional bracket 832 has been guided via the guiding surface 879 such that the drive link angle of the drive link 806 is zero and adjacent surfaces of the guiding portion 833 of the rear drive shoe 830 and the rear drive shoe slot of the functional bracket 832 are flush. In an embodiment of the fourth position S868, forward translation along the travel axis 874 is complete, and the glass panel attached to the bracket 831 is seated within the glass panel seal of the sunroof apparatus housing (not shown). With the glass panel in a fully-closed position, the closing operation is completed and the sunroof apparatus control device awaits a subsequent user command.

Full Operation of Sunroof Apparatus

According to an embodiment, the constraining portion of the guiding drive shoe, the constrained portion of the drive link, the guiding portion of the rear drive shoe, and the guided portion of the functional bracket are combined in full operation of a sunroof apparatus. To this end, initially, a sunroof apparatus control device, having a processing circuitry, receives a user command indicating a desired position of the above-described sunroof apparatus S950. In an embodiment, the desired position of the sunroof apparatus is, among others, an opened position or a tilted position. In an example, the desired position of the sunroof apparatus is an opened position. In response, the sunroof apparatus control device initiates translation of the guiding drive shoe and the rear drive shoe in a rearward direction along the travel axis, thereby engaging with one or more pins of the drive link S951.

In order to move the glass panel of the sunroof apparatus into a tilted position, or an intermediary position, the drive link is moved from a first position to a second position wherein one of the one or more pins of the drive link slides within the first guide channel of the guiding drive shoe, thereby increasing the drive link angle and lifting the glass panel S952. Having achieved the second position, or tilted position, the guiding drive shoe and rear drive shoe are further translated along the travel axis such that the drive link is moved from the second position to a third position, the third position being an opened position S953. During movement of the drive link from the second position to the third position, contact between the constrained portion of the drive link and the constraining portion of the guiding drive shoe maintains the drive link angle formed at the second position and alleviates environmental stresses applied to the drive link.

In an embodiment, from the third position, the sunroof apparatus control device awaits further command from the user indicating a desired subsequent position of the sunroof apparatus S954. If no command is received, the sunroof apparatus control device continues to monitor a user interface until such a command is received. Upon receiving a user command to initiate a closing operation, the guiding drive shoe and the rear drive shoe are translated in a forward direction S956. As the drive link is moved from the third position to the second position, the constraining portion of the guiding drive shoe and the constrained portion of the drive link maintain a drive link angle S957. In an embodiment, following the second position, the drive link angle begins to decrease as the guiding drive shoe and the rear drive shoe are further translated and one of the one or more pins slides within the first guide channel of the guiding drive shoe. In cases of highway travel, for example, upon reaching the first position S958, the drive link angle may be non-zero. To this end, as the guiding drive shoe and rear drive shoe are translated forward, the guiding surface of the guiding portion of the rear drive shoe contacts the abutting surface of the guided portion of the functional bracket, guiding the functional bracket downward S959. As the functional bracket is rotated aft about one of the one or more pins of the drive link in response to being guided by the guiding portion of the rear drive shoe, the glass panel is brought into close proximity with the glass panel seal of the sunroof apparatus housing. With the drive link angle having reached zero and an air tight seal being formed between the glass panel and the glass panel seal of the sunroof apparatus housing in a fully-closed position, the sunroof apparatus control device awaits a subsequent user command.

Figure 10:
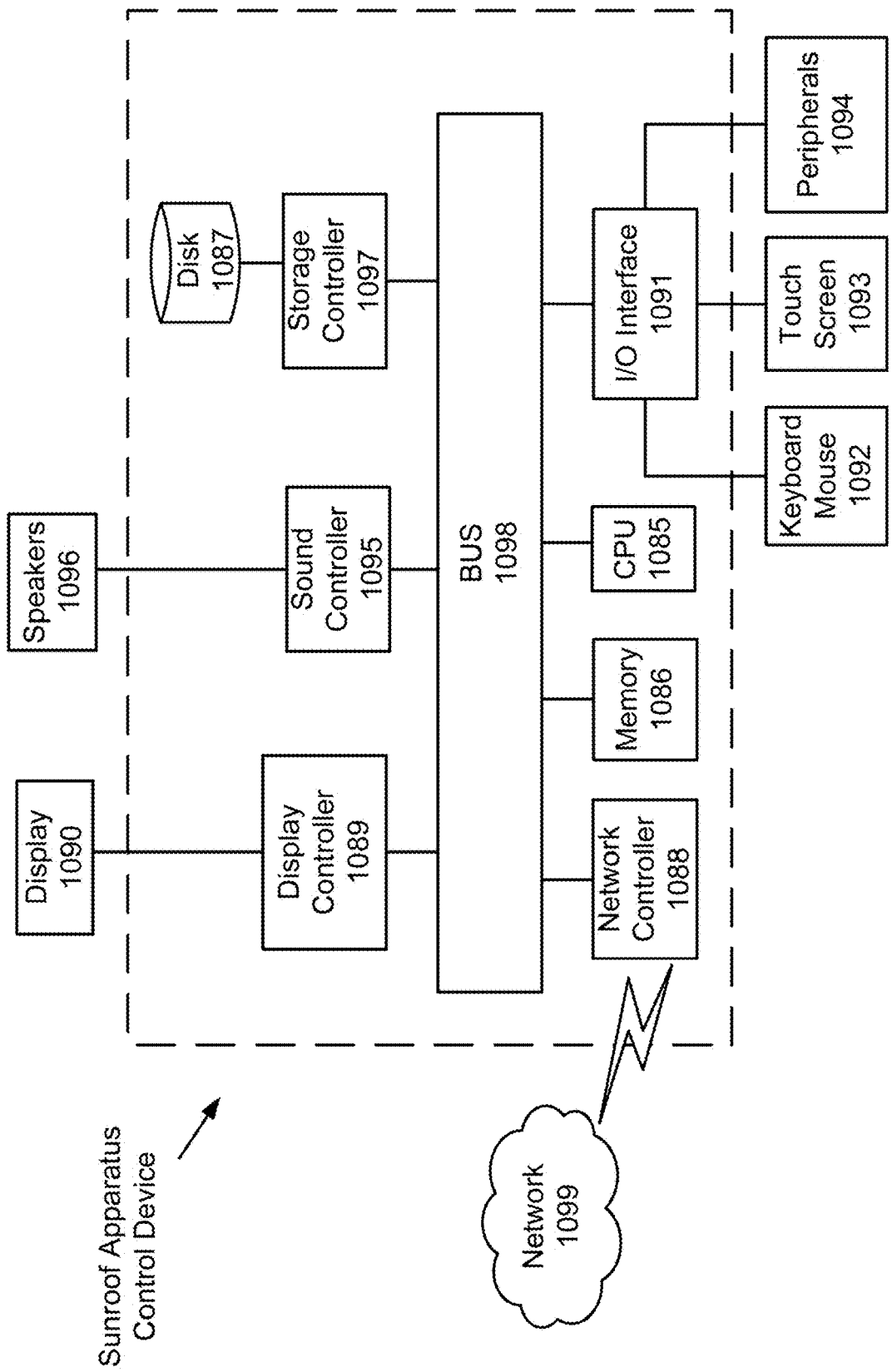
FIG. 10 is a hardware schematic of a sunroof apparatus control device, according to an exemplary embodiment of the present disclosure.

Next, a hardware description of the sunroof apparatus control device according to exemplary embodiments is described with reference to FIG. 10. In FIG. 10, the sunroof apparatus control device includes a CPU 1085 which performs the processes described above. The process data and instructions may be stored in memory 1086. These processes and instructions may also be stored on a storage medium disk 1087 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the sunroof apparatus control device communicates, such as a server or computer.

Further, the claimed advancements may be provided as a utility application, background daemon, or component of an operating system, or combination thereof, executing in conjunction with CPU X00 and an operating system such as Microsoft Windows 7, UNIX, Solaris, LINUX, Apple MAC-OS and other systems known to those skilled in the art.

The hardware elements in order to achieve the sunroof apparatus control device may be realized by various circuitry elements, known to those skilled in the art. For example, CPU 1085 may be a Xenon or Core processor from Intel of America or an Opteron processor from AMD of America, or may be other processor types that would be recognized by one of ordinary skill in the art. Alternatively, the CPU 1085 may be implemented on an FPGA, ASIC, PLD or using discrete logic circuits, as one of ordinary skill in the art would recognize. Further, CPU 1085 may be implemented as multiple processors cooperatively working in parallel to perform the instructions of the inventive processes described above.

The sunroof apparatus control device in FIG. 10 also includes a network controller 1088, such as an Intel Ethernet PRO network interface card from Intel Corporation of America, for interfacing with network 1099. As can be appreciated, the network 1099 can be a public network, such as the Internet, or a private network such as an LAN or WAN network, or any combination thereof and can also include PSTN or ISDN sub-networks. The network 1099 can also be wired, such as an Ethernet network, or can be wireless such as a cellular network including EDGE, 3G and 4G wireless cellular systems. The wireless network can also be WiFi, Bluetooth, or any other wireless form of communication that is known.

The sunroof apparatus control device further includes a display controller 1089, such as a NVIDIA GeForce GTX or Quadro graphics adaptor from NVIDIA Corporation of America for interfacing with display 1090, such as a Hewlett Packard HPL2445w LCD monitor. A general purpose I/O interface 1091 interfaces with a keyboard and/or mouse 1092 as well as a touch screen panel 1093 on or separate from display 1090. General purpose I/O interface 1091 also connects to a variety of peripherals 1094 including printers and scanners, such as an OfficeJet or DeskJet from Hewlett Packard.

A sound controller 1095 is also provided in the sunroof apparatus control device, such as Sound Blaster X-Fi Titanium from Creative, to interface with speakers/microphone 1096 thereby providing sounds and/or music.

The general purpose storage controller 1095 connects the storage medium disk 1087 with communication bus 1098, which may be an ISA, EISA, VESA, PCI, or similar, for interconnecting all of the components of the sunroof apparatus control device. A description of the general features and functionality of the display 1090, keyboard and/or mouse 1092, as well as the display controller 1089, storage controller 1095, network controller 1088, sound controller 1095, and general purpose I/O interface 1091 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A rear drive shoe assembly for a sunroof apparatus of an automotive vehicle, comprising:
 a rear bracket, at an aft end of a bracket, including a guided portion; and
 a rear drive shoe including a guiding portion to guide the guided portion of the rear bracket and a rear bracket slot, the rear bracket slot receiving the guided portion of the rear bracket,
 wherein the bracket holds a glass panel of the sunroof apparatus and is operably-coupled to a drive link, the drive link including a pin projecting from a surface of the drive link,
 wherein the pin projecting from the surface of the drive link is slidably-coupled to a guiding drive shoe as a rotation center, and
 wherein the rear drive shoe is coupled to a motor, the motor translating the rear drive shoe in a forward direction.

2. The rear drive shoe assembly according to claim 1, wherein the rear bracket includes a rear drive shoe slot, the rear drive shoe slot receiving the guiding portion of the rear drive shoe.

3. The rear drive shoe assembly according to claim 1, wherein the drive link is operably-coupled to the bracket via a coupling at one or more through holes in the rear bracket.

4. The rear drive shoe assembly according to claim 1, wherein the guiding portion of the rear drive shoe includes a guiding surface including one or more curvatures.

5. The rear drive shoe assembly according to claim 1, wherein the guided portion of the rear bracket includes a surface including one or more curvatures.

6. The rear drive shoe assembly according to claim 5, wherein one of the one or more curvatures of the surface of the guided portion of the rear bracket is a curvature of an abutting surface.

7. The rear drive shoe assembly according to claim 5, wherein one of the one or more curvatures of the surface of the guided portion of the rear bracket is a curvature of a guided surface, the guided surface of the guided portion of the rear bracket being congruent with a curvature of a guiding surface of the guiding portion of the rear drive shoe.

8. The rear drive shoe assembly according to claim 1, wherein a first dimension of the guided portion of the rear bracket is equivalent to a first dimension of the guiding portion of the rear drive shoe.

9. The rear drive shoe assembly according to claim 1, wherein, during translation of the rear drive shoe in the forward direction, contact between a surface of the guided portion and a guiding surface of the guiding portion moves the drive link.

10. The rear drive shoe assembly according to claim 1, wherein, following translation of the rear drive shoe in the forward direction, a drive link angle formed between a longitudinal axis of the drive link and a longitudinal axis of the guiding drive shoe is zero.

11. A method of a sunroof apparatus, comprising:
 receiving, via processing circuitry, a user command indicating a closing operation of the sunroof apparatus; and
 translating, via the processing circuitry, a rear drive shoe including a guiding portion, the guiding portion guiding a guided portion of a rear bracket at an aft end of a bracket holding a glass panel of the sunroof apparatus,
 wherein the bracket is operably-coupled to a drive link including a pin projecting from a surface of the drive link,
 wherein the pin projecting from the surface of the drive link is slidably-coupled to a guiding drive shoe and is a rotation center, wherein the rear drive shoe is coupled to a motor, the motor translating the rear drive shoe in a forward direction, and wherein, during forward translation, the guided portion of the rear bracket enters a rear bracket slot within the rear drive shoe.

12. The method according to claim 11, wherein the rear bracket includes a rear drive shoe slot, the rear drive shoe slot receiving the guiding portion of the rear drive shoe.

13. The method according to claim 11, wherein the drive link is operably-coupled to the bracket via coupling at one or more through holes in the rear bracket.

14. The method according to claim 11, wherein the guiding portion of the rear drive shoe includes a guiding surface including one or more curvatures.

15. The method according to claim 11, wherein the guided portion of the rear bracket includes a surface including one or more curvatures.

16. The method according to claim 15, wherein one of the one or more curvatures of the surface of the guided portion of the rear bracket is a curvature of an abutting surface.

17. The method according to claim 15, wherein one of the one or more curvatures of the surface of the guided portion of the rear bracket is a curvature of a guided surface, the guided surface of the guided portion of the rear bracket being congruent with a curvature of a guiding surface of the guiding portion of the rear drive shoe.

18. The method according to claim 11, wherein a first dimension of the guided portion of the rear bracket is equivalent to a first dimension of the guiding portion of the rear drive shoe.

19. The method according to claim 11, wherein, during translation of the rear drive shoe in the forward direction, contact between a surface of the guided portion and a guiding surface of the guiding portion moves the drive link.

20. The method according to claim 11, wherein, following translation of the rear drive shoe in the forward direction, a drive link angle formed between a longitudinal axis of the drive link and a longitudinal axis of the guiding drive shoe is zero.

* * * * *